United States Patent
Winter et al.

(10) Patent No.: US 9,103,939 B2
(45) Date of Patent: Aug. 11, 2015

(54) METHOD AND DEVICE FOR DETECTING A CONDUCTIVE OBJECT

(75) Inventors: Andreas Winter, Feldkirch (AT); Torsten Gogolla, Schaan (LI); Dietmar Schoenbeck, Goefis (AT); Andreas John, Walenstadt (CH); Christoph Wuersch, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 299 days.

(21) Appl. No.: 13/488,819

(22) Filed: Jun. 5, 2012

(65) Prior Publication Data

US 2013/0057249 A1    Mar. 7, 2013

(30) Foreign Application Priority Data

Jun. 7, 2011    (DE) ..................... 10 2011 077 068

(51) Int. Cl.
*G01V 3/15* (2006.01)
*G01N 27/72* (2006.01)
*G01V 3/38* (2006.01)
*G01V 3/00* (2006.01)

(52) U.S. Cl.
CPC ... *G01V 3/38* (2013.01); *G01V 3/00* (2013.01)

(58) Field of Classification Search
None
See application file for complete search history.

(56) References Cited

U.S. PATENT DOCUMENTS

| | | | |
|---|---|---|---|
| 6,541,966 B1 * | 4/2003 | Keene | 324/243 |
| 6,897,777 B2 * | 5/2005 | Holmes et al. | 340/572.2 |
| 6,967,574 B1 * | 11/2005 | Nelson | 340/551 |
| 2003/0052684 A1 | 3/2003 | Nelson et al. | |
| 2008/0054893 A1 * | 3/2008 | Humphreys et al. | 324/239 |
| 2008/0309344 A1 * | 12/2008 | Larsen | 324/326 |
| 2009/0110301 A1 * | 4/2009 | Schopp et al. | 382/224 |
| 2011/0068795 A1 * | 3/2011 | Duvoisin, III | 324/326 |

FOREIGN PATENT DOCUMENTS

| | | |
|---|---|---|
| CA | 2178332 | 4/1996 |
| DE | 4436078 | 4/1996 |
| DE | 69722014 | 4/2004 |
| DE | 699 17 030 T2 | 4/2005 |
| DE | 60106215 | 4/2005 |

* cited by examiner

*Primary Examiner* — Melissa Koval
*Assistant Examiner* — Courtney McDonnough
(74) *Attorney, Agent, or Firm* — Davidson, Davidson & Kappel, LLC

(57) ABSTRACT

A method for detecting an electrically and/or magnetically conductive object in a vicinity of a sensor head of a device, having the following steps:
    emitting a transmitting signal into the surroundings,
    receiving a received signal as a function of the transmitting signal and the characteristics of the object and the surroundings,
    analyzing a response signal formed from the received signal.
According to the invention, the detection is controlled by
    providing a class system having a number of classes, which differ from one another in at least one object and/or surroundings characteristic, and
    classifying instantaneous object and/or surroundings characteristics as a function of the analyzed response signal in a class of the class system, and
    predefining detection characteristics which are preset in the classified class, a further response signal being detected using the predefined detection characteristics.

22 Claims, 6 Drawing Sheets

METHOD AND DEVICE FOR DETECTING A CONDUCTIVE OBJECT

This claims the benefit of German Patent Application DE 10 2011 077 068.2 filed Jun. 7, 2011 and hereby incorporated by reference herein.

The present invention relates to a method for detecting an electrically and/or magnetically conductive object in a vicinity of a sensor head, in particular based on a pulse induction measuring principle. The present invention also relates to a device for detection.

BACKGROUND

In the construction sector and auxiliary sectors, and also in the case of renovation measures, such a detection device, also referred to as a metal detector, is used, for example, to check whether or not a wall to be drilled through contains metallic objects. In general, a detection device may be used for locating electrically conductive objects, for example, also pipelines, in the floor or in a wall.

A device mentioned at the outset, which is also referred to hereafter as a detection device, may fundamentally be based on various measuring principles. One measuring principle is formed using a so-called continuous wave method, in which a continuous, typically low-frequency current is generated in a transmitting coil in the frequency range of several tens of kilohertz. With the aid of a receiving coil, a received signal, which arises due to an electromagnetic coupling between an electrically conductive object in the substrate and the emitted signal, is received and typically analyzed in the spectral range. In this measuring principle, either one measuring signal of a single frequency or a measuring signal which includes signal components in various frequency ranges is emitted. A detection device which is based on the above-described measuring principle is also referred to as a CW metal detector, CW standing for "continuous wave."

A detection device may also be based on a so-called pulse induction measuring principle. A pulse generator typically generates a pulse-like electrical current, which is applied to a coil of a transmitter, also referred to as a transmitting coil. A pulsed magnetic field is thus generated, which impinges on a conductive object located in the substrate. According to electromagnetic interactions, the pulsed magnetic field induces an eddy current in the electrically conductive object, which decays after a certain time as a function of the transmitter current pulse pattern. The induced eddy current in the electrically conductive object then generates a secondary magnetic field, which is received by a receiver, e.g., a coil, in the detection device. This secondary magnetic field is typically received with the aid of a coil of the receiver referred to as a receiving coil, in which the secondary magnetic field induces a receive current, which is then amplified by an amplifier connected downstream from the receiving coil. The amplified received signal is conducted to a so-called gate, which represents a barrier with respect to time. The gate is operated by a previously known detection device in such a way that it is only open for a very specific period of time after the application of a current pulse to the transmitting coil. For example, a delay unit is connected between the pulse generator and the gate, which prompts an opening of the gate after a fixed time after the triggering of the transmitter current pulse. The function of the gate is thus to eliminate an influence of the directly received transmitting pulse and it allows the receiving coil to nonetheless detect the secondary magnetic field. The output signal of the gate is typically integrated by an integrator, which sums the cumulative signal over multiple pulses and makes this signal available for a display device. A detection device which is based on this measuring principle is also referred to as a PI metal detector, PI standing for "pulse induction."

One or the other of the two above-described measuring principles is alternately implemented as a function of the field of use of the detection device and as a function of requirements which are placed on the detection device, for example, precision and/or power consumption. A metal detector, which may carry out both the CW and also the PI measuring principle, is known from the publication DE 699 17 030 T2. The metal detector described therein has a transmitter unit having a number of transmitting coils and a receiver unit having a number of receiving coils. In addition, the metal detector includes a so-called signal processing apparatus for correcting shifts in the case of measured components of received magnetic field gradients. For example, a received signal which has been distorted due to an incorrect orthogonal alignment of receiving coils in the receiver of the metal detector is thus post-corrected. However, this may be very time-consuming.

SUMMARY OF THE INVENTION

All of the previously known approaches for the detection of conductive objects also have the disadvantage that the employed detection devices operate with fixedly predefined settings, e.g., in the PI measuring principle they operate with fixedly predefined pulse sequences and measuring times. Fixedly predefined settings commonly do not match with specific object situations to be detected. An excessively low measuring sensitivity of a detection device for an object situation having little response potential may only be compensated for by increased measuring effort. In the case of an object situation having a high response potential, an excessively high measuring sensitivity results in constant saturation of a receiver in the detection device. This may also make increased measuring effort necessary, in order to locate an electrically and/or magnetically conductive object more precisely in the surroundings and/or to judge its characteristics more precisely. Measuring time which may be better used is lost overall.

It is desirable to detect an electrically and/or magnetically conductive object with high detection quality, but with less time expenditure.

It is an object of the present invention to provide a method and a device for detecting an electrically and/or magnetically conductive object in a vicinity of a sensor head, the electrically and/or magnetically conductive object being better detectable in its surroundings in regard to object and/or surroundings characteristics.

The present invention provides a method for detecting an electrically and/or magnetically conductive object in a vicinity of a sensor head of a device is provided, having the following steps:

emitting a transmitting signal into the surroundings, receiving a received signal which is a function of the transmitting signal and the characteristics of the object and the surroundings, analyzing a response signal formed from the received signal and controlling the transmission and reception.

Furthermore, the following steps are provided according to the present invention:

providing a class system having a number of classes, which differ from one another in at least one object and/or surroundings characteristic, and classifying instantaneous object and/or surroundings characteristics as a function of the response signal into a class of the class system, predefining preset detection characteristics in the classified class, a further response signal being detected using the predefined detection characteristics.

To advantageously refine the concept of the present invention, the classification is performed adaptively in particular, i.e., adapted to the instantaneous object and/or surroundings characteristics. For example, a logic which uses the class system may be designed as a support vector machine and/or a fuzzy logic and/or a neuronal network for adaptive classification. The detection characteristics which determine the detection method and a measuring environment of a detection device are then adapted in a particularly preferred way to the object and/or surroundings characteristics, which improves the detection overall. It has thus proven to be particularly preferable for the detection characteristics to include: transmitting characteristics and/or receiving characteristics and/or analysis characteristics. The detection is preferably controlled in that a further transmitting signal is emitted using the set transmitting characteristics, and/or a further received signal is received using the set receiving characteristics, and/or the further received signal and/or the further response signal formed from the other received signal is analyzed using the set analysis characteristics.

An electrically and/or magnetically conductive object may in particular be located more precisely and/or judged more precisely in its characteristics. In particular, fewer false alarms are triggered during a detection. The detection precision and rapidity in relation to detection devices and detection methods known from the related art is increased due to the adapted specification of detection characteristics. In particular, a detection method may thus be made more effective. As a result, a time expenditure for detection may be decreased while nonetheless improving the precision.

The object with respect to the device is achieved by the invention with the aid of a device of the type mentioned at the outset, in which the features of the characterizing part of claim 9 are also provided according to the present invention.

In particular for executing the method according to the present invention, the device for detecting an electrically and/or magnetically conductive object in a vicinity of a sensor head of the device provides:

a transmitter unit, which has one or multiple transmitters and is designed to emit a transmitting signal into the surroundings, a receiver unit, which has one or multiple receivers and is designed to receive a received signal as a function of the transmitting signal and the characteristics of the object and the surroundings, a control and evaluation unit, which is designed to control the transmitting and receiver units and to analyze a response signal formed by the receiver unit from the received signal.

According to the present invention, the device also has:

a classification unit using a class system, in which object and/or surroundings characteristics are classified in classes, the class system having a number of classes which differ from one another in at least one object and/or surroundings characteristic, and preset detection characteristics for the device being assigned to a class.

The present invention proceeds from the consideration that previously known detection devices of the type mentioned at the outset each operate using a fundamentally fixed transmitting signal, which is not adapted as a function of the condition of the surroundings, the condition of the electrically and/or magnetically conductive object to be detected, and/or the position of the detection device in relation to the surroundings. Furthermore, the present invention has recognized that in previously known detection devices, not only is the emitted transmitting signal fundamentally established, but rather also the means and methods for receiving the received signal from the surroundings are not adapted to the instantaneous surroundings, the electrically and/or magnetically conductive object to be detected, and/or the position of the detection device in relation to the surroundings. In previously known detection devices, no control or regulation of the detection device thus occurs as a function of the instantaneous object and/or surroundings characteristics, in particular not of the transmitter or the receiver. In addition, the measurements take a comparatively long time in the previously known detection devices, which is fundamentally disadvantageous. In contrast to detection devices of the related art, which are therefore to be referred to as non-adaptive, the concept of the present invention provides an automatic classification method within the scope of the detection method due to the classification, which adapts a measuring environment of the device and the detection characteristics linked thereto to instantaneous object and/or surroundings characteristics.

Other advantageous refinements of the present invention may be inferred from the subclaims and specify in detail advantageous possibilities for implementing the above-explained concept within the scope of the statement of the object and with respect to further advantages. This relates in particular to refinements of the device and the method.

The surroundings characteristics include in particular substrate characteristics. The object characteristics include in particular material characteristics and/or geometry characteristics of the object. The specification of a characteristic dimension and an associated category of a characteristic in the characteristic dimension are particularly advantageous. The characteristic dimension, on the one hand, and the category, on the other hand, may be used as field parameters for a matrix or a similar multidimensional field. The entries of such a matrix may be used to represent classes of a class system in the classification unit. The characteristic dimension may be selected in particular from the following group:

geometry or position of an object in the surroundings;

condition of the surroundings, in particular a substrate or a wall;

material characteristics of an object, in particular conductivity and permeability;

geometry characteristics of an object, in particular distribution and distribution density of multiple objects or a larger object.

Conditions are subsequently assigned to the surroundings with respect to the material composition. The condition of the surroundings may relate, e.g., to a concrete or a soil composition. Material characteristics are subsequently assigned to the object. The material characteristic includes in particular a chemical material characteristic, such as the material per se, and a physical material characteristic, such as the conductivity or permeability of the object. Geometry characteristics of the object, such as the distribution, may relate to a propagation of a single object, e.g., the propagation of a grating. The distribution density may relate to a single object, e.g., a mesh density of a single grating, or a cluster of multiple small objects, e.g., the distribution density of granular electrically and/or magnetically conductive objects.

The classification unit is preferably directly or indirectly connected to the transmitter unit and/or the receiver unit with respect to control. In particular, the classification unit is connected with respect to control to a control and evaluation unit, which has a control unit and an evaluation unit. The evaluation unit is provided to analyze a response signal formed from the received signal and in particular to relay it to the classification unit. The classification unit is therefore also incorporated in a control unit or connected to a control unit. The control unit, in particular as predefined by the classification unit, may make controlling specifications to a manipulated variable at least for the above-mentioned transmitter unit and/or the receiver unit. The manipulated variable initially does not necessarily have to be settable with feedback of a deviation between reference variable and controlled variable of a controller. The classification unit may also be incorporated in a controller or connected to a control unit of a controller. A regulator is preferably capable, in particular within a class of the class system, of adapting in a controlling manner predefined detection characteristics, in particular for a transmitter unit and/or a receiver unit and/or evaluation unit, as a manipulated variable with feedback of a deviation between the reference variable and the controlled variable. A response signal may be used as the controlled variable, for example. For example, a certain amplitude or a certain signal-to-noise ratio of a response signal may be predefined as the reference variable. The signal-to-noise ratio may be predefined with the aid of a value for a signal-to-noise ratio (SNR value). The detection characteristics preferably also include control characteristics, with the aid of which a response signal may be automatically controlled in a control step, and/or abort conditions, with the aid of which the control step may be terminated.

The detection, in particular classification and/or regulation, may be performed fully automatically (without manual intervention). In particular, classification may be performed with averaging of the response signal. The averaging increases the reliability of a classification.

The detection, in particular classification and/or regulation, may be performed semi-automatically (with manual intervention). In particular, object and/or surroundings characteristics may be reclassified multiple times, if a user recognizes a delay or an inadequate result of a detection procedure. If an abort condition is present, a control step may preferably be terminated and a starting group of detection characteristics may be set.

The advantages of a classification may be explained as an example on the basis of an emitted electromagnetic transmitting signal, which impinges on the surroundings and possibly on the object to be detected. An electromagnetic interaction occurs between the transmitting signal and the surroundings and the object. The response signal thus results. In particular, the receiver unit may be designed to derive the response signal from an electromagnetic secondary field, which arises through eddy currents induced by the previously emitted electromagnetic transmitting signal in the surroundings and in particular in the object to be detected. For this purpose, the receiver unit includes, for example, a receiver coil, an amplifier having an analog filter, a gate, an integrator, and an analog-digital converter (A/D converter). The gate is used for the purpose of eliminating the influence of the directly received transmitting pulse and is switched with the aid of a delay unit, the delay unit prompting opening of the gate at a starting time (gate starting time), i.e., after a fixed time after the triggering of the transmitting pulse, for a duration (gate period). The output signal of the gate is filtered by the analog filter, amplified by the amplifier, and integrated by the integrator, which sums the cumulative signal over an averaging time or in the PI mode over multiple pulses (number of the averaging cycles). The analog filter is, for example, a Sallen-Key filter, whose filter structure (filter characteristics) is adaptable with the aid of the control and evaluation unit to an object and/or surroundings characteristic. The amplifier is designed to be adaptable via its amplifier characteristics to an object and/or surroundings characteristic. Filtering and integration may alternatively or additionally be carried out by a digital filter or a digital integrator of the control and evaluation unit. In the case of digital filtering and integration, the characteristics of the digital filter (filter coefficients) and the digital integrator (averaging time, integration time) are designed to be adaptable.

Advantageously, the condition of the surroundings and/or the material characteristics of the object to be detected may be inferred and classified from the analysis of the response signal—for example, with the aid of the classification unit, in particular together with the control and evaluation unit. The relative characteristics between a sensor head and the object or geometry characteristics of the object may also be inferred. In general, instantaneously present object and/or surroundings characteristics may be classified in a provided class system, in that the instantaneously present object and/or surroundings characteristics are assigned to a class of the class system. A detection characteristic, which is predefined corresponding to the class and is therefore particularly suitable for the instantaneous object and/or surroundings characteristic, e.g., a particularly suitable coil configuration, may be selected, i.e., preferably the one which is assigned to the classified class.

The detection device may be based on various measuring principles, for example, on the CW measuring principle or on the PI measuring principle or on both of these measuring principles. An emitted electromagnetic transmitting signal is alternately a pulsed signal or a continuous signal. The transmitter unit of the detection device preferably has a corresponding current setting device, which is designed, for example, to apply an electrical current of a specific form to each of the number of transmitting coils independently of the particular remaining coils.

The present detection device is preferably based on the PI measuring principle. A detection method according to the concept of the present invention thus preferably uses a pulse induction measuring principle, in which a generated transmitting signal has an electromagnetic pulse sequence, possibly also only a single pulse.

Within the scope of the description, detection means at least the signaling of a presence of an object to be detected in the surroundings. Improved detection, for which purpose the detection device is preferably also designed, signals not only the presence of the object to be detected in the substrate, but rather also allows information which permits the position of the detected object in the surroundings to be deduced, and/or information which permits the geometric and/or material composition of the detected object and/or the surroundings to be deduced.

An electrically and/or magnetically conductive object means in particular an object which, due to its material condition, reacts substantially differently than the surroundings to an electromagnetic transmitting signal emitted by the transmitter unit of the detection device. Typically, the electrical and/or magnetic conductivity of the object to be detected is very much greater than the electrical and/or magnetic conductivity of the surroundings in which it is located. An example of this is an iron girder in a concrete wall or a pipeline in the ground. Due to this characteristic, the interaction between the electromagnetic transmitting signal and the object to be detected is very much more pronounced than the interaction of the surroundings with the electromagnetic exciter signal. The electrically and/or magnetically conductive object in the surroundings may be, for example, a welded grating, a power cable, such as a copper cable, a metal pipe, a plate, an iron girder, a reinforcing bar, a coin, a projectile, or a mine—fundamentally any electrically and/or magnetically conductive object embedded in a substrate. The surroundings in which the electrically and/or magnetically conductive object is located is typically a substrate, such as a soil substrate or a wall, a floor, or a roof or a ceiling in a building or in a building under construction. An electrically and/or magnetically conductive object to be detected is preferably located in the vicinity of the sensor head of the detection device. A distance of approximately 1 mm up to several meters, possibly up to 5 m, preferably lies between the sensor head of the detection device and the conductive object to be detected. The distance is normally between 5 cm and 3 m.

A logic using the class system—preferably a support vector machine and/or a fuzzy logic and/or a neuronal network—particularly preferably classifies instantaneous object and/or surroundings characteristics adaptively as a function of the response signal. In particular, it has proven to be advantageous to generate a response signal provided specifically for the purpose of classifying the object and/or surroundings characteristics, also referred to hereafter as the pre-response signal. In this context, the response signals generated after a classification with the aid of the pre-response signal are referred to hereafter as the main response signals.

Within the scope of one particularly preferred refinement, a transmitter is formed in the form of a coil. In a preferred transmitter unit, an electrical current, for example, may be applied to each of the number of preferably formed transmitting coils independently of the particular remaining transmitting coils. An evaluation unit may particularly preferably be designed to determine, i.e., to select a coil configuration as a function of the pre-response signal, to which at least one transmitting coil of the number of transmitting coils a current is applied to emit a further transmitting signal. In the context of a preferred transmitter unit in the form of a transmitting coil, the transmitting signal is also referred to as the exciter signal. A transmitting coil and a receiving coil may preferably be integrated into a coil configuration or—alternatively or additionally—may be formed with the aid of the same coil, which is switched once in transmitting operation and once in receiving operation.

For example, the precision of the detection device may be increased using a transmitter unit of a general type—preferably of the above-mentioned type based on a coil—if the detection device initially emits in a pre-measurement operation a first transmitting signal, which is designated in the case of a transmitting coil as an exciter signal, and receives a pre-response signal, which is a function of the condition of the surroundings and of the emitted transmitting signal. A further transmitting signal, which is adapted to the surroundings and to the electrically and/or magnetically conductive object to be detected, may then be emitted in a time-effective way in the main measurement operation—e.g., with the aid of a coil configuration which has been determined as a function of the pre-response signal—and only then may the main response signal be used in order to actually detect the electrically and/or magnetically conductive object via a received signal and to output a corresponding response signal to a control and evaluation unit of the detection device.

Within the scope of the description, a transmitting signal in general and an exciter signal in particular preferably each refer to a signal which the detection device emits; in particular after it has detected the pre-response signal and has selected the at least one transmitting coil, the signal is also referred to as the main response signal. Initially, a received signal generated from a transmitting signal results outside the detection device due to a signal change mainly caused by the object, for example, because the electrically and/or magnetically conductive object withdraws energy from the transmitting signal. The received signal received in a receiver unit generates a response signal. A response signal may therefore mean in particular a pre-response signal or a main response signal or both the pre-response signal and the main response signal. The pre-response signal and/or the main response signal may be response signals which are generated with the aid of a receiver unit on the basis of the received signal actually transmitted back from the surroundings and/or the electrically and/or magnetically conductive object to the detection device, for example, according to the above-explained PI measuring principle.

One refinement has recognized that certain transmitting or exciter signal forms are better suited for certain surroundings and/or for certain objects to be detected than previously fixed signal forms, in order to detect the respective electrically and/or magnetically conductive certain object in the certain respective surroundings. For example, the refinement has recognized that an entirely different transmitting signal form is suitable for detecting a mesh-like welded grating in a concrete wall than for detecting a coin in an earthy ground. A first exciter signal form may be achieved, for example, using a first certain coil configuration and a different second exciter signal form may be achieved using a second certain coil configuration.

Within the scope of one particularly preferred refinement, a classification unit is designed in particular to classify a thus suspected object and/or surroundings characteristic on the basis of a response signal and to specify a preset of the detection device as a function of a classification result obtained thereon. This is performed on the basis of the transmitting characteristics for the transmitter unit and/or receiving characteristics for the receiver unit and/or analysis characteristics for the control and evaluation unit, which are preferably assigned to each class.

The transmitting characteristics of the transmitter unit preferably include transmitter parameters, using which each of the transmitters is operable, for each class of the class system and for each transmitter of the transmitter unit. In particular the transmitter parameters include one or multiple of the parameters which are selected from the group including: pulse repetition frequency, pulse amplitude, pulse polarity, energizing period. These parameters relate in particular to the operation of a transmitting coil or the like in the PI mode. The transmitting signal may thus be optimized in regard to an object and/or surroundings characteristic.

The receiving characteristics of the receiver unit preferably include receiver parameters, using which each of the receivers is operable, for each class of the class system and for each receiver of the receiver unit. In particular, the receiver parameters include one or multiple parameters which are selected from the group including: filter characteristics, amplifier characteristics, gate starting time and gate period, averaging time or number of the averaging cycles. These parameters relate in particular to the operation of a receiver coil in the PI mode. Preferably, a number of averaging cycles may be optimized depending on the signal strength and signal-to-noise ratio of the response signal, and thus either the response signal may be improved or time may be saved.

The analysis characteristics for the control and evaluation unit preferably include, for each class of the class system, one or multiple of the parameters which are selected from the group including: averaging times, integration times, filter coefficients. The analysis of a response signal may thus be optimized in regard to an object and/or surroundings characteristic.

In addition, certain fundamental settings which affect the measurement, such as the selection of the at least one transmitting coil and/or the determination of the measuring method, may also be performed within the scope of the above-mentioned refinements. In addition, the above-mentioned characteristics, preferably the establishment of the sampling rate, the amplification, the energizing period, the measuring time, and/or the maximum current, may be preset.

With the aid of the classification unit—preferably based on a detected pre-response signal (optionally also based on a more or less arbitrary estimation)—an actual object and/or environmental characteristic of a specific class may thus be deduced. The classification unit may determine a particular class adaptively for the object and/or surroundings characteristics, i.e., in addition specify a measuring environment for the detection device adapted to the actual object and/or surroundings characteristic, in that preset detection characteristics are predefined in the classified class. The detection characteristics preferably include, but are not restricted to, transmitting characteristics, receiving characteristics, and/or analysis characteristics which are preset in the classified class. Thus, a measuring environment for the detection device may be adapted, for example, to the condition of the surroundings of the object and/or the condition of the object to be detected. For example, corresponding classes may be provided with a measuring environment for a "highly permeable substrate." Relative characteristics between the sensor head of the detection device and the object, e.g., a distance between sensor head and object or a geometric configuration of the sensor head in relation to the object, may also be taken into consideration in the adapted measuring environment. Thus, for example, a measuring environment may be adapted for a position or geometry of the object in the surroundings. For example, corresponding classes may be provided with a measuring environment for a "mesh-like netting" as an object. By assigning object and/or surroundings characteristics to classes, a structured adaptation of the detection device may be performed with the aid of one of the detection characteristics.

In particular, the detection device may also carry out an automatic substrate compensation as a function of the instantaneous class, in which the receiver unit eliminates interfering components in the response signal which are induced by the substrate. For this purpose, a certain energizing period may be established and/or a certain coil configuration may be selected for the receiver unit. For each class, it may thus not only already be determined which certain coil configuration and/or which certain measuring method is to be predefined. In addition, preferably at least one sampling rate, amplification, energizing period, measuring time, and/or a maximum current for the detection device may be established in the main measurement operation.

In the above-mentioned refinement of the detection device, the classification unit is designed to determine a value of at least one classification parameter, also referred to as a category, from the pre-response signal for a characteristic dimension to represent the class of a class system. A field of classes may thus be spanned, a characteristic dimension being provided on a first axis of the field and a category for a characteristic dimension being provided on a second axis of the field. A field of classes is additionally not restricted to two axes. A classification parameter may be predefined in particular for a characteristic dimension such as the geometrical characteristic of an object (e.g., small, large, grating), for an electrical and/or magnetic conductivity (e.g., high, low), or another material characteristic of an object and/or the surroundings, a position or geometry of an object in the surroundings (e.g., close, distant, grating), and used for the classification. The more characteristic dimensions and/or classification parameters are available and are determined for a characteristic dimension, the more finely may a determination of object and/or surroundings characteristics, i.e., a class assignment thereof in the class system, be performed. A measuring environment assigned to each of the classes is characterized in particular by certain parameters assigned to a class for a characteristic of the transmitter unit, receiver unit, and/or evaluation unit. Reference is made as an example to a field relevant for the class system, as is explained within the scope of the description of one preferred specific embodiment of FIG. 1 and FIG. 2.

The detection device therefore allows improved detection, in particular improved localization and improved determination of a geometry of the detected object; this is performed, for example, in a substrate such as concrete, brick, wood, or plaster. The selected coil configuration is thus adapted to the characteristics of the surroundings and/or to the characteristics of the conductive object to be detected and therefore operates in a very time-effective way with increased precision.

Within the scope of one particularly preferred refinement, it is provided that the classes have one or more of the classes from the group including:

a first class provided for gratings;

a second class provided for dense objects, in particular with little overlap;

a third class provided for deep objects;

a fourth class provided for magnetic substrates;

a fifth class provided for a certain movement direction;

a sixth class provided for nonmagnetic, conductive objects.

If the classification unit recognizes, for example, on the basis of the pre-response signal that the object to be detected is located with relatively little overlap, the measuring time has a comparatively long duration, e.g., a duration in the millisecond range.

If, in another example, the classification unit recognizes on the basis of the pre-response signal that the object to be detected lies comparatively deep in the substrate, it prompts an emission of the further exciter signal at comparatively high amplitude, such as 80 dB, and detection of the main response signal at a comparatively high sampling rate, such as $\frac{1}{200}$ µs=5 kHz, in comparison to an otherwise perhaps typical sampling rate of 1 kHz. The noise component in the main response signal may thus be reduced, since the receiver unit does not detect magnetic fields of eddy currents which are still being induced by the further exciter signal, on the one hand, and it may average more frequently in a predefined measuring time, on the other hand.

The transmitting characteristics of the transmitter unit particularly preferably include switching a preferred chronological sequence (sequence) and/or switching a preferred spatial configuration (configuration) of the transmitters activated in the transmitter unit. The receiving characteristics of the receiver unit preferably additionally or alternatively include the sequence and/or configuration of the receivers activated in the receiver unit. Transmitter and receiver may preferably be formed using the same component, e.g., the same coil, and may each be switched differently for transmitting and receiving. Within the scope of one particularly preferred refinement, one transmitter and one receiver are each integrated as one or multiple coils into a coil complex, the coil complex being switchable with the aid of the control and evaluation unit between a transmitting mode, in which one coil of the coil complex emits a transmitting signal, and a receiving mode, in which one coil of the coil complex receives a receiving signal. A significant savings potential thereby also results with regard to installation space, material, and interconnection outlay. The number of the coils is, for example, between 2 and 50, preferably approximately 10 to 20, for example, 14 or 16 coils or certainly also other numbers.

Within the scope of one particularly preferred design refinement, the transmitting coils of the transmitter unit each differ from one another in their position within the transmitter unit, in their size, in their diameter, and/or in their current carrying capacity. This has the advantage that the control and evaluation unit may select one or multiple certain transmitting coils for emitting the adapted exciter signal, which, due to their position or positions within the transmitter unit, their size or their sizes, their diameter or their diameters, and/or their current carrying capacity or their current carrying capacities, are particularly well suited for detecting an instantaneously present certain object in instantaneously present certain surroundings. Overall, the detection device according to the above-mentioned refinement displays an increased separation capability in relation to previously known detection devices, i.e., a capability of detecting objects in the surroundings with higher resolution. For example, for detecting a comparatively large object, the classification unit selects a transmitting coil which has a comparatively large diameter, and for detecting a comparatively small object, it selects a transmitting coil having a comparatively small diameter.

For example, if, according to the pre-response signal, the object is a plurality of objects located closely adjacent to one another, which are only overlapped with comparatively little substrate, the control and evaluation unit selects those transmitting coil or transmitting coils which has or have a comparatively narrow and oblong coil symmetry or a differential coil symmetry. If the analysis of the response signal has the result, for example, that the surroundings are a strongly magnetically conductive substrate, the control and evaluation unit selects a differential coil configuration, which may already compensate for the effect of the permeable substrate in the first order.

In another example, if the analysis of the pre-response signal has the result that the object to be detected is a welded grating, the control and evaluation unit selects a coil configuration which induces a vanishingly small flux in the substrate. This prevents eddy currents from being induced in the meshes of the welded grating, which could otherwise result in distortion of the main response signal. The detection device is thus in particular preferably designed, in the case of a welded grating and the substrate, to detect the position of the grating struts and not, for example, the middle of a mesh in the grating.

As a result, in this refinement of the detection device, the classification unit specifies at least one such transmitting coil or spatial arrangement of transmitting coils (configuration) of the transmitter unit, whose type is best suited for the instantaneous measurement requirement. The classification unit is particularly preferably additionally designed to establish a chronological sequence (sequence), in which the selected coils are to be energized successively to emit the further exciter signal.

In particular within the scope of the adaptation of the transmitter unit of the detection device, the classification unit is designed in one refinement to establish a value of a magnetic permeability of an energizing period as a function of the pre-response signal, within which current is to be applied to the at least one selected transmitting coil to emit the further exciter signal. The detection device may thus suppress or compensate as much as possible for effects of a magnetic viscosity, which would cause an approximately constant substrate interfering signal.

In particular for the further transmitter-side adaptation of the detection device to instantaneous object and/or surroundings characteristics, the classification unit is designed to establish a maximum current as a function of the pre-response signal, which is to be applied to the at least one selected transmitting coil (transmitter in general) to emit the further exciter signal (transmitting signal in general) at the beginning of the emission. This may be achieved, for example, in that the absolute value of a charging voltage of a capacitor connected upstream from a particular transmitting coil is established.

According to one refinement, the classification unit is designed to operate the transmitter unit and/or the receiver unit according to a number of different variants of measuring methods. The classification unit is designed to determine as a function of the pre-response signal which of the number of various measuring methods the controller selects for operating the transmitter and/or the receiver unit. According to the refinement, it was recognized that to improve the detection characteristics of the detection device, not only a hardware setting (such as the coil sequence and/or configuration) may be adapted to the instantaneous object and/or surroundings characteristic and the measurement requirements connected thereto for generating a usable signal. Rather, a measuring method on which the detection method is based may also be adapted to obtain a usable or improved main response signal.

Variants of measuring methods applied within the scope of the detection method differ, for example, in the form of the current which is applied to the at least one selected transmitting coil (transmitter in general). Alternatively or additionally, the various measuring methods may differ in the type of the detection of the response signal. For example, the classification unit may be designed to recognize from the pre-response signal that the object to be detected is, for example, an iron girder in a concrete wall (class for dense objects, in particular with little overlap). In addition, the emission of the adapted transmitting signal may be performed according to a particularly suitable measuring method, in order to thus obtain a main response signal for improved detection of the iron girder. In contrast, if the classification unit recognizes in another measuring environment that the object to be detected is a mesh-like netting in a highly permeable substrate (class for gratings), the classification unit determines that the transmitter unit proceeds to emit a transmitting signal according to a second measuring method.

In particular, the control and evaluation unit may be designed to cause an electromagnetic pulse sequence in a certain way in chronological succession. On the basis of the instantaneous object and/or surroundings characteristics, for example, on the basis of predefined detection characteristics, a measuring environment may be predefined, which initially provides a first pulse (in particular emitted using a first selected transmitting coil) and then provides a second pulse (in particular emitted via a second selected transmitting coil) for detection or for improved detection. A main response signal may thus include two signal components, of which the first signal component has been induced by the first pulse and the second signal component has been induced by the second pulse. The receiver unit is preferably designed to perform the detection of the object by analyzing these two signal components.

To detect the pre-response signal and the main response signal, the receiver unit of the detection device has, in one refinement, at least one receiving coil and is designed to measure an electrical current in the at least one receiving coil by a plurality of sampling actions at one sampling rate. For improved adaptation of the detection device to the instantaneous measuring environment, it is advantageous if the control and evaluation unit establishes this sampling rate for the detection of the main response signal as a function of the pre-response signal. The detection device may be adapted to the instantaneous measuring environment by selection of one or multiple certain transmitting coils for emitting the adapted exciter signal. Optionally, the certain measuring method to be applied within the scope of the detection method may be determined. It is additionally advantageous to adapt the sampling rate of the receiver unit to the surroundings and/or the object to be detected. For example, if the response signal is interfered with by an external signal source, a control unit advantageously adapts the sampling rate of the receiver unit until an SNR value of the main response signal exceeds a certain SNR threshold value.

Because a measuring time is established as a function of the pre-response signal, a pulse repetition frequency is preferably also established. The detection device emits a further exciter signal in each case after a current in the receiving coil drops below a predetermined current threshold value within the established measuring time; this is performed until the main response signal has an SNR value which is higher than an SNR threshold value. The detection device is preferably designed to repeat the emission of an exciter signal until the SNR value of the main response signal exceeds a predetermined SNR threshold value. The receiver unit of the detection device only uses the main response signal to detect the object in the surroundings after the predetermined SNR threshold value is exceeded. The risk of false alarms is reduced in this way above all.

Within the scope of one particularly preferred refinement, a controller of the detection device is designed to determine an SNR value of the pre-response signal and to perform the selection of the at least one transmitting coil and/or the determination of the measuring method and/or the establishment of the sampling rate, the amplification, the energizing period, the measuring time, and/or the maximum current in such a way that the SNR value of the main response signal is greater than the SNR value of the pre-response signal. The measuring environment of the detection device is thus adapted in an improved way to the instantaneous object and/or environmental characteristic.

Main response signals which have a high SNR value are achieved by an above-mentioned preferred automatic adaptation of the detection device.

The receiver unit is preferably designed for the purpose of performing a monostatic and/or a bistatic measurement of a current in the receiving coil or receiving coils.

In particular for the case in which the detection device is based on a PI measuring principle, the receiver unit for detecting the pre-response signal and the main response signal includes at least one controllable measuring amplifier for amplifying a measuring signal. The measuring signal may be, for example, a receiving current in the receiving coil of the receiver unit. For further adaptation of the detection device to the instantaneous measuring environment, it is preferable for the control unit to establish the amplification of the controllable measuring amplifier for the detection of the main response signal.

The method preferably also includes the specification of a measuring time during the additional step of a classification on the basis of a pre-response signal. The classification unit is preferably designed to establish a measuring time, within which the receiver unit has to detect the main response signal, as a function of the pre-response signal for the control and evaluation unit. In one refinement, for example, the detection device may be designed to determine, in a pre-measurement operation, controlled variables for controlling a gate of the receiver unit as a function of the pre-response signal and then to control the gate during the main measurement operation to detect the main response signal as a function of the established controlled variables. This refinement is preferred in particular if the detection device is based on a PI measuring principle.

For example, according to one preferred refinement of the detection method, in a pre-measurement operation the pre-response signal is detected and in a main measurement operation the main response signal is detected, with the aid of which the object is more precisely detected in the surroundings. In addition, it has proven to be advantageous for a control unit to be designed for automatic (non-manual) control of at least the main response signal as a controlled variable. The control unit may thus be connected to the classification unit and the control and evaluation unit and/or the transmitter unit and/or the receiver unit with respect to control to form a control loop. In particular, the control unit may be designed for automatic (non-manual) control of at least one amplitude and/or SNR value of the response signal as a controlled variable.

It has thus proven to be particularly preferable to assign preset control characteristics for the control unit to each class of the class system. In particular, the control characteristics, as a controlled variable, may include one or multiple control parameters, from the group including:

pulse repetition frequency, pulse amplitude and/or input amplification, pulse polarity, energizing period;

averaging times, integration times, in particular measuring time, and/or sampling interval, filter coefficients;

filter characteristics, amplifier characteristics, gate starting time and gate period, averaging time or number of the averaging cycles.

A received signal and/or the response signal itself is/are preferably used as the controlled variable. An amplitude and/or an SNR value of the received signal and/or response signal may preferably be used as the reference variable.

In addition, it has proven to be advantageous to design a user interface and/or a control unit to trigger the classification unit multiple times for the renewed and/or averaging classification of object and/or surroundings characteristics. A user interface which is used for the interaction between the detection device and a user is also referred to as an MMI (man-machine interface) and is designed, e.g., as a beeper, display screen, or the like. It may be advantageous if it is signaled to the user by an MMI that a control unit has not adapted the controlled variable in a desired way to the reference variable. For this purpose, for example, a timeout time window or another abort condition may be provided, which triggers a renewed and/or averaging classification of object and/or surroundings characteristics multiple times when it is present.

In particular, the analyzed further response signal or a pre-response signal and/or the set transmitting, receiving, analysis, and/or control characteristics may be stored for this purpose. Thus, for example, if an abort condition is present, the control step may be terminated and a particular stored, original, or other possibly individually established starting group of transmitting, receiving, and analysis characteristics may be set.

For further adaptation of the detection device to the instantaneous object and/or environmental characteristics, in one particularly preferred refinement, the detection device additionally has a position sensor, which is designed to generate a position signal as a function of the position of the detection device in relation to the surroundings. The position signal may indicate, for example, that one of the number of transmitting coils is aligned or is not aligned or the relative speed between the detection device and the surroundings or a distance between the detection device and a substrate in the surroundings. The control unit is preferably designed to perform the selection of the at least one transmitting coil and/or the determination of the measuring method and/or the establishment of the sampling rate, the amplification, the energizing period, the measuring time, and/or the maximum current additionally as a function of the position signal.

According to one refinement, the detection device is in particular not only adapted to the instantaneous object and/or surroundings characteristics, but rather, for example, also to a relative speed between the detection device and the surroundings or to an instantaneous alignment of the detection device in relation to the surroundings. The precision of the detection device is thus increased once again.

BRIEF DESCRIPTION OF THE DRAWINGS

Exemplary embodiments of the present invention will be described hereafter on the basis of the drawings. These drawings are not necessarily to show the exemplary embodiments to scale, rather the drawings are implemented in schematic and/or slightly distorted form where it is helpful for the explanation. Reference is made to the relevant related art with regard to supplementations of the teachings directly recognizable from the drawings. It is to be considered that manifold modifications and changes with respect to the shape and the detail of a specific embodiment may be performed, without deviating from the general idea of the present invention. The features of the present invention disclosed in the description, in the drawing, and in the claims may be essential both individually and also in arbitrary combination for the refinement of the present invention. In addition, all combinations of at least two features disclosed in the description, the drawings, and/or the claims are within the scope of the present invention. The general idea of the present invention is not restricted to the exact form or the detail of the preferred specific embodiment which is shown and described hereafter, nor is it restricted to an object which would be restricted in comparison to the object claimed in the claims. In the case of predefined dimensioning ranges, values lying within the mentioned limits are also disclosed as limiting values and may be arbitrarily used and claimed. For the sake of simplicity, identical reference numerals and symbols are used hereafter for identical or similar parts or parts having an identical or similar function.

Further advantages, features, and details of the present invention result from the following description of the preferred exemplary embodiments and on the basis of the drawings.

DETAILED DESCRIPTION

Figure 1:
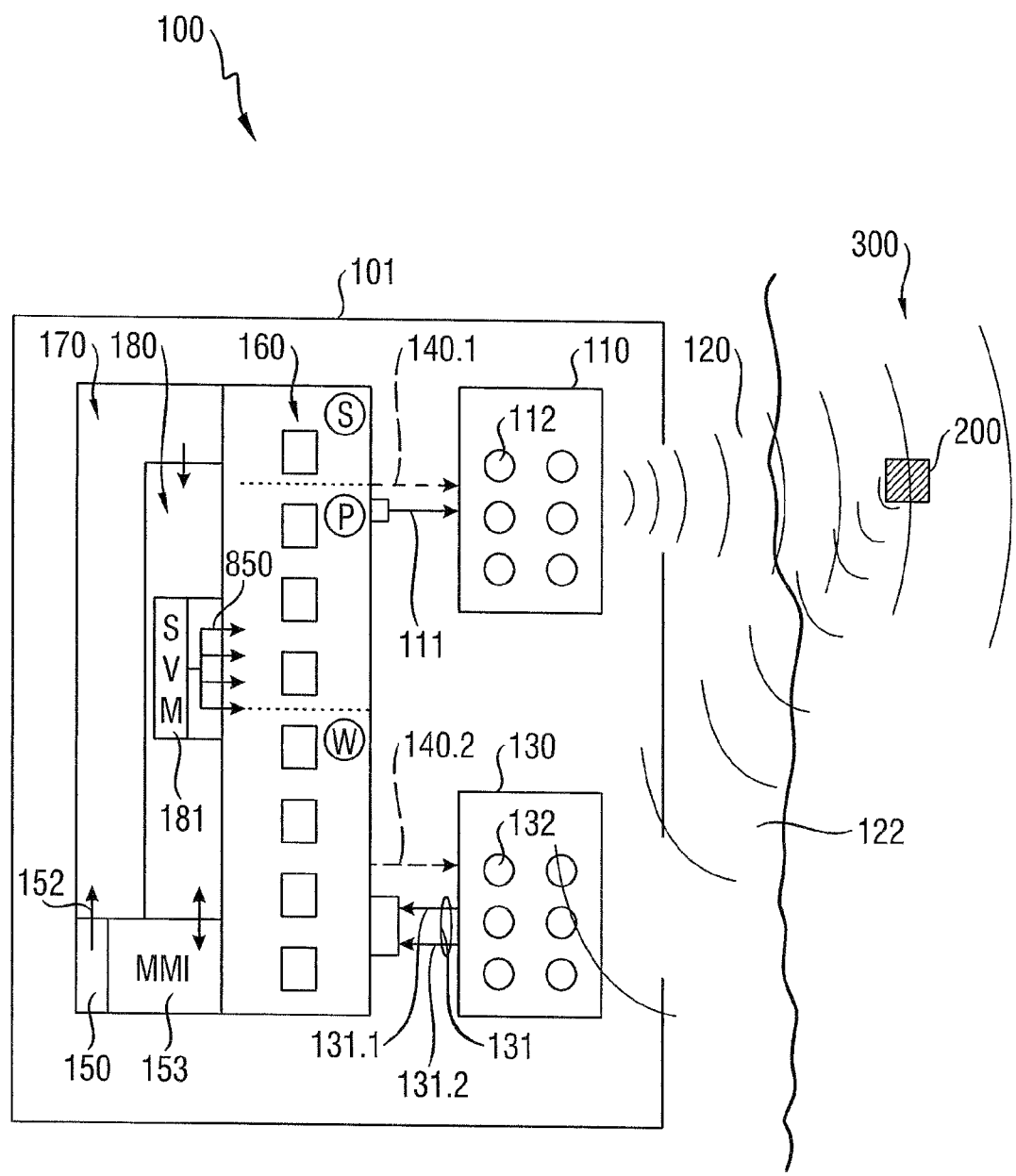
FIG. 1 shows a block diagram of a detection device according to one preferred specific embodiment.

FIG. 1 shows a block diagram of one preferred specific embodiment of a detection device 100. Detection device 100 is used here for detecting an electrically and/or magnetically conductive object 200 in surroundings 300 in the vicinity of a sensor head 101 of detection device 100. Surroundings 300, for example, a substrate, may include, for example, concrete, bricks, wood, or plaster—i.e., typical materials as may be found in buildings or buildings under construction. The distance between sensor head 101 of detection device 100 and surroundings 300 is typically not very great and is between several millimeters and several meters; in the present case, it is not more than several centimeters.

Detection device 100 includes, in addition to sensor head 101, a housing having a handle or similar handling means, using which detection device 100 may be guided over the substrate. At least one transmitter unit 110 and one receiver unit 130 are accommodated in sensor head 101 here. In the present case, sensor head 101 also includes a control and evaluation unit 160, which is controlled by a control unit 170, as are transmitter unit 110 and receiver unit 130. In addition, a user interface 153, in the present case an MMI, ensures suitable signaling with respect to an operating state and/or a detection result to a user. Detection device 100 is thus designed in the present case for manual operation and includes typical components for this purpose, such as a handle, one or multiple operating buttons, signal output means such as a display panel or acoustic signal output means, and similar further components, which may all be implemented in FIG. 1 with the aid of user interface 153.

Transmitter unit 110 has multiple transmitters 112, which are designed to emit an electromagnetic transmitting signal 120 into surroundings 300. Receiver unit 130 has multiple receivers 132, which are designed to receive a received signal 122 as a function of transmitting signal 120 and the characteristics of object 200 and surroundings 300. Receiver unit 130 is designed to detect a received signal 122 as a function of emitted transmitting signal 120 and the condition of surroundings 300. In the present case, transmitters 112 are designed as transmitting coils and receivers 132 are designed as receiving coils. Transmitting and receiving coils 112, 132 may be formed as part of a coil complex 114, which is explained on the basis of FIG. 4. The coils of coil complex 114 are alternately switched or energized and read out as receiving coils 132 of receiver unit 130 or transmitting coils 112 of transmitter unit 110 for this purpose. Received signal 122 is converted depending on the receiving characteristics for receiver unit 130 into a suitable response signal 131, which provides information about object and/or surroundings characteristics of object 200 or surroundings 300 of object 200. Control and evaluation unit 160 is capable of analyzing this response signal 131 and providing information about object 200 to user interface 153 (MMI).

Receivers 132 of receiver unit 130 and transmitters 112 of transmitter unit 110 are activated via control signals 140.1 and 140.2 in a suitable way to provide an informative response signal 131 in sensor head 101.

Emitted electromagnetic transmitting signal 120 interacts, as shown, with surroundings 300 and electrically and/or magnetically conductive object 200. For example, electrically and/or magnetically conductive object 200 generates, according to the above-explained pulse induction measuring principle, a secondary magnetic field upon receiving emitted electromagnetic transmitting signal 120, which receiver unit 130 registers as received signal 122 with the aid of at least one receiving coil of receiver unit 130. Receiving coil 132 may thus physically be the same coil as one of transmitting coils 112, but if necessary with different current feed and/or readout 111 according to the specification of control and evaluation unit 160.

Furthermore, detection device 100 includes a classification unit 180, which is designed to control transmitter unit 110, receiver unit 130, and control and evaluation unit 160. Classification unit 180 may, for example, together with control and evaluation unit 160 and control unit 170, form a controller, in the present case also having a control function, for transmitter unit 110 and receiver unit 130. The controller is embodied here in the form of an integrated circuit, which is accommodated together with transmitter unit 110 and receiver unit 130 in sensor head 101.

Figure 2:
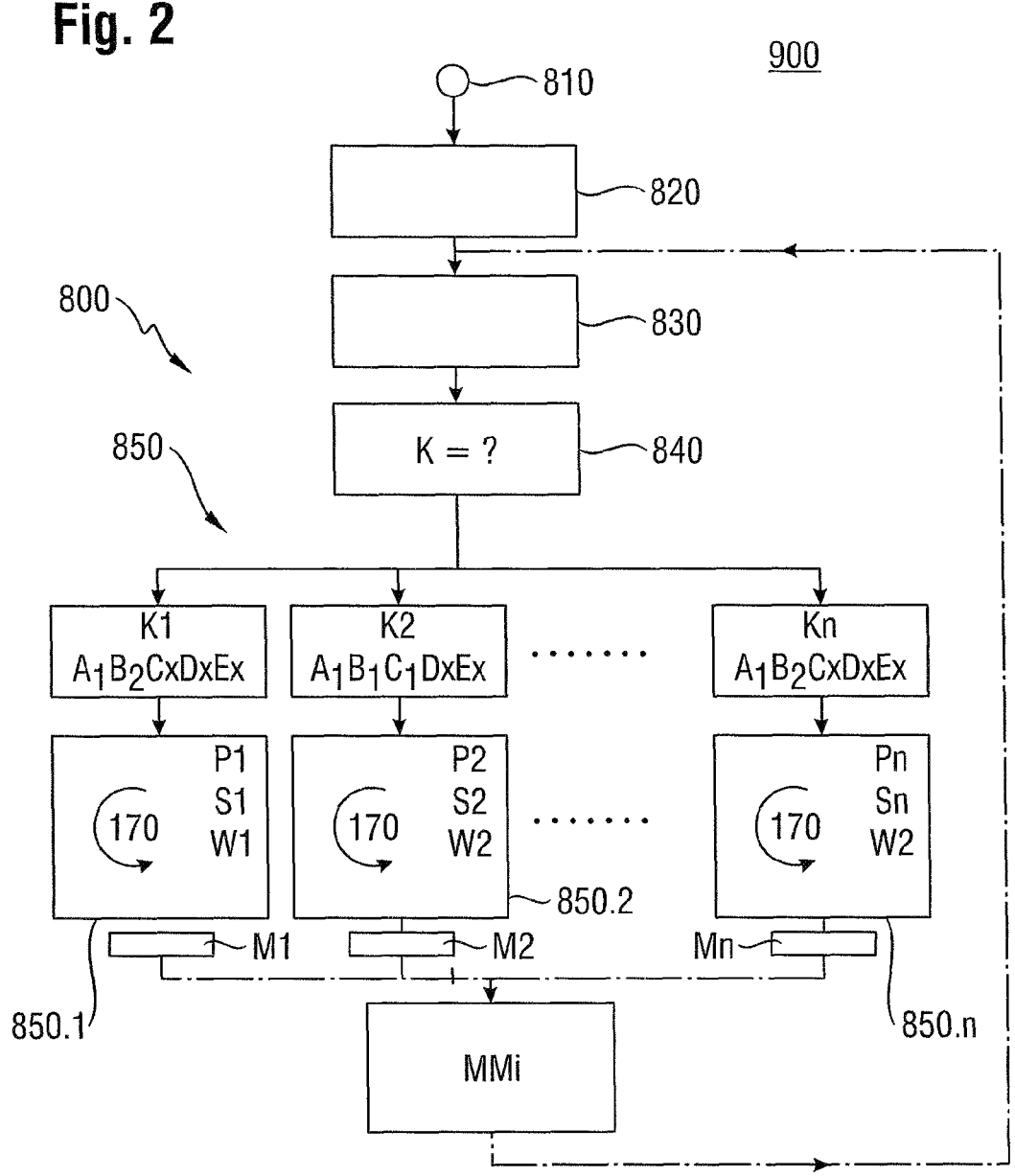
FIG. 2 shows a flow chart to illustrate a classification method with the aid of a pre-response signal and with illustration of an exemplary class system.

In the present case, classification unit 180 includes a logic 181, in the present case in the form of a support vector machine (SVM), which uses a class system 850 shown as an example within the scope of a classification method 800 in FIG. 2. Class system 850 provides a number of classes K1 . . . Kn, which is symbolically shown in FIG. 1 and explained in greater detail in FIG. 2, in which instantaneous object and/or surroundings characteristics of object 200 may be adaptively classified with the aid of logic 181 and as a function of response signal 131, i.e., instantaneously present characteristics are assigned to one of classes K1 . . . Kn. Classes K1 . . . Kn of class system 850 differ from one another in at least one object and/or surroundings characteristic and are explained for exemplary purposes on the basis of FIG. 2.

In the present case, classification unit 180 uses a class system 850, which spans a matrix of classes K1 . . . Kn to represent classes K1 . . . Kn with the aid of a characteristic dimension A . . . E (dimension) and a classification parameter 1, 2, 3 . . . x, y (category) for the characteristic dimension. For example, substrate characteristics are established in the categories for characteristic dimensions A, B. For example, object characteristics are established in the categories for characteristic dimensions C, D, E. An example of a two-dimensional field formed from characteristic dimension and category is the matrix of classes filled with content reproduced in Table 1.

TABLE 1

| Dimension | Category 1 | Category N | Possible Measured Variables (Feature Vectors) |
|---|---|---|---|
| A. Geometry | Close | Distant | Amplitude |
| B. Substrate | Air | Brick | Amplitude/curvature |
| C. Object material | Ferromagnetic | Non-ferromagnetic | Amplitude/curvature |

TABLE 1-continued

| Dimension | Category 1 | Category N | Possible Measured Variables (Feature Vectors) |
|---|---|---|---|
| D. Object geometry | Grating welded | Grating not welded | Differential/single coil |
| E. Object density | Dense | Separated | Small coils/large coils |

A specification of the class is performed here via a key $A_iB_jC_kD_lE_m$ with i, j, k, l, m=1 . . . n for the category and A, B, C . . . for the dimension. Thus—for example, according to FIG. 2—a series of classes K1 . . . Kn may be predefined.

A measuring environment, which is assigned to each of classes K1 . . . Kn and is predefinable for sensor head 101, is established by certain detection characteristics. The detection characteristics are established by parameters P assigned to class K1 . . . Kn. Parameters P may characterize a transmitting characteristic of transmitter unit 110, a receiving characteristic of receiver unit 130, and an analysis characteristic of control and evaluation unit 160. Classification unit 180 is connected to transmitter unit 110, receiver unit 130, and control and evaluation unit 160 with respect to control, so that the parameters for a characteristic which are assigned to a class K1 . . . Kn may be transmitted to mentioned units 110, 130, 160 with the aid of control signals 140.1 and 140.2. In this way, transmitter unit 110, receiver unit 130, and control and evaluation unit 160 may be operated in a controlled manner according to a parameter set 850.1 . . . 850.n established for a specific class K1 . . . Kn.

As is apparent from FIG. 1, for example, (chronological) sequences and/or (spatial) configurations S of coils of coil complex 114 are activatable with the aid of control and evaluation unit 160. At least three parameters P may also be activated as transmitter parameters for a transmitting coil, in the present case specifically a pulse repetition frequency PRF, pulse amplitude, pulse polarity, and energizing period. At least three parameters W may also be activated as analysis parameters for control and evaluation unit 160, in the present case specifically averaging times, integration times, and filter coefficients. The possibility of activating the receiving characteristics of receiver unit 130 with the aid of a receiver parameter, using which each of receivers 132 is operable, is not shown; this is specifically performed here in the form of the filter characteristics, amplifier characteristics, gate starting time and gate period, averaging time, or number of the averaging cycles.

An electrical current may thus be applied to each transmitter 112 in the form of transmitting coils independently of the remaining transmitters. For this purpose, transmitter unit 110 has a current setting device represented with the aid of current feed and/or readout 111, which applies an electrical current to one or multiple of the transmitting coils as a function of a control signal 140.1 provided by classification unit 180. The current form and also the energizing period are each predefined by parameters P assigned to a class K1 . . . Kn of class system 850.

Figure 5:
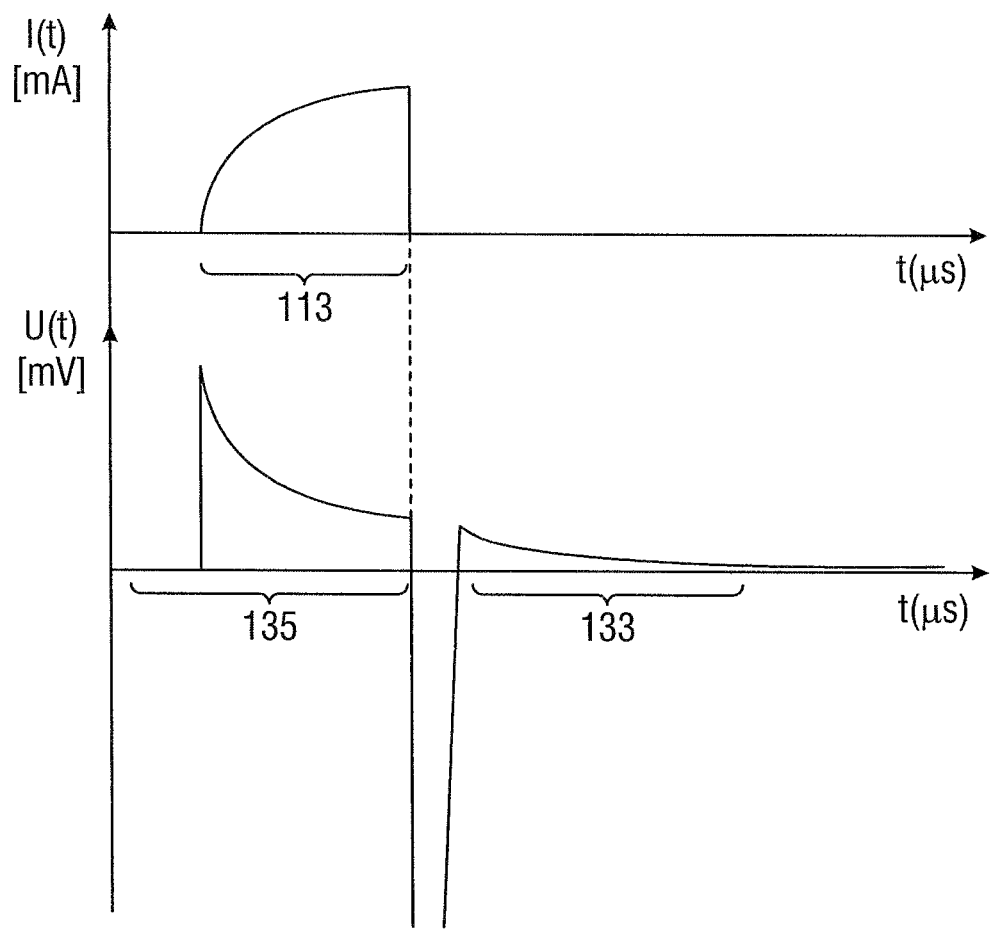
FIG. 5 shows two graphs for the schematic illustration of a transmitted current curve and a voltage curve in a transmitting coil.

Classification unit 180 thus advantageously pre-classifies object and/or surroundings characteristics and assigns instantaneous characteristics in class system 850. This may be performed, e.g., by plausible estimation or simply on the basis of a predefined starting class. It is thus possible to preset a starting group of transmitting, receiving, and analysis characteristics for the start of classification unit 180. However, classification unit 180 will preferably assign instantaneous object and/or surroundings characteristics in class system 850 on the basis of a response signal 131 in the form of a pre-response signal 131.1. Solely an example of a pre-response signal 131.1 may result, for example, from the energizing state of a transmitting coil, as is shown in FIG. 5. This means that object and/or surroundings characteristics which are to be assumed on the basis of a response signal 131 are assigned with the aid of classification unit 180 into one of the number of established predefined classes K1 . . . Kn. A set of parameters Si, Pi, Wi, i=1 . . . m is assigned to affected class Ki of the number of classes K1 . . . Kn—i.e., e.g., key $A_iB_jC_kD_lE_m$ which is to be established by the dimension and category. These parameters P, which are referred to as a whole as P, may indicate, e.g., a sequence and/or configuration of coils, transmitting characteristics for transmitter unit 110, receiving characteristics for receiver unit 130, and analysis characteristics for control and evaluation unit 160, according to which a measurement Mi for generating a response signal 131 as main response signal 131.2 may be performed. Solely an example of a main response signal 131.2 results, for example, from the decaying voltage state of a coil, as shown in FIG. 5. With the aid of main response signal 131.2, which is ascertained in a comparatively time-effective way, a nonetheless reliable detection of object 200 is possible, since main response signal 131.2 was obtained with the aid of a measuring environment adapted to the object and/or surroundings characteristics in measurement Mi. A structured adaptation of the detection device is thus performed on the basis of the measuring environments established in classes K1 . . . Kn. Due to adapted detection device 100, unnecessary measuring effort is avoided and the remaining measuring effort is used effectively as a function of object and/or surroundings characteristics.

Classification unit 180 is specifically designed to classify, as a function of response signal 131, pre-response signal 131.1, which has been detected by receiver unit 130 and is a function of initially emitted electromagnetic transmitting signal 120. It is accordingly then selected to which at least one transmitting coil 132 of the number of transmitters 112 an electrical current is applied to emit a further transmitting signal 120 as transmitting signal 120. In the present case, in a pre-measurement operation, receiver unit 130 initially detects a received signal 122 to form a response signal 131 as pre-response signal 131.1, which provides information about a probably existing instantaneous object and/or surroundings characteristic, i.e., in particular about the condition of the surroundings and/or about the condition of conductive object 200 to be detected. Before a main measurement operation, in the above-explained way, an optimum sequence and/or configuration S, which is predetermined in class system 850, of coils for the instantaneous object and/or surroundings characteristic is activated automatically with the aid of classification unit 180. It is comparatively well suited for detecting a main response signal 131.2 having an improved SNR value.

The emission of further adapted transmitting signal 120 with the aid of transmitter unit 110 and the detection of improved received signal 122 as a function thereof with the aid of receiver unit 130 form a main measurement operation of detection device 100. Control unit 170 is thus designed, e.g., with operation of optimum sequence and/or configuration S of coils, to cause emission of further transmitting signal 120, which is adapted with the aid of selected configuration S. In FIG. 1, for the sake of simplicity, both the first emitted transmitting signal for detecting response signal 131 as pre-response signal 131.1 and also the adapted or the further transmitting signal for detecting further response signal 131 as main response signal 131.2 are identified by reference numeral 120. Receiver unit 130 is additionally designed to detect electrically and/or magnetically conductive object 200 as a function of optimized further transmitting signal 120, i.e., to provide on the basis of a received signal 122, which is also improved, a response signal 131 as main response signal 131.2, using which the object and/or surroundings characteristic may be determined comparatively well.

Classification unit 180 is not only designed in the present case for the purpose of determining a sequence and/or configuration S of coils for emitting further transmitting signal 120, which was explained above only as an example. Rather, the type of the emission of further transmitting signal 120 and reception of received signal 122 are also controlled with the aid of classification unit 180 and control and evaluation unit 160; this is performed, for example, by determining a certain measuring method. The determination of a certain transmitting method may also be accompanied by the establishment of a sampling rate, using which receiver unit 130 detects a current in a receiver 132 in the form of a receiving coil, by the establishment of an amplification of an amplifier of receiver unit 130, an energizing period, a measuring time, and/or a maximum current. A measuring environment of detection device 100 is thus adapted optimally to the instantaneously present object and/or surroundings characteristic. Transmitter unit 110 receives instructions required for this purpose via a first control signal 140.1 provided by control and evaluation unit 160, and receiver unit 130 receives the instructions via a second control signal 140.2.

Furthermore, detection device 100 shown in FIG. 1 has a position sensor 150, which is designed to generate, as a function of the position of detection device 100 in relation to the surroundings, a position signal 152, in particular a time-dependent position signal 152, such as the speed of the detection device relative to surroundings 300. Position signal 152 is supplied here to control unit 170. Classification unit 180 is designed to perform the selection of the at least one transmitting coil not only as a function of pre-response signal 131.1, but rather also as a function of position signal 152, which may be supplied directly thereto from position sensor 150 or via control unit 170. For example, a high speed of detection device 100 with an otherwise uniform measuring environment may require a different coil configuration than a very low speed or a stoppage of detection device 100.

In particular, control unit 170 is designed in the present case for the purpose of automatically controlling further response signal 131 in a control step, with the aid of the control characteristics assigned to above-mentioned class Ki, to a preset setpoint value of a reference variable. Control unit 170 is specifically designed for the automatic (non-manual) regulation of at least response signal 131 as the controlled variable. Control unit 170 is connected to classification unit 180 and to control and evaluation unit 160, transmitter unit 110, and receiver unit 130 with respect to control to form a control loop. In the present case, alternately an amplitude A and/or an SNR value of response signal 131 may be automatically (non-manually) controlled as the controlled variable; an example of using an SNR value of response signal 131 as the controlled variable is explained on the basis of FIG. 6.

Moreover, in the present case preset control characteristics for control unit 170 are also assigned to each class K1 . . . Kn of class system 850—via parameter sets 850.1 . . . 850.n. A main response signal 131.2 may still be specifically improved with respect to its quality in that one or multiple of the control parameters are used as the controlled variable, from the group including: pulse repetition frequency, pulse amplitude, pulse polarity, energizing period; averaging times, integration times, filter coefficients, filter characteristics, amplifier characteristics, gate starting time and gate period, averaging time or number of the averaging cycles.

For example, the above-mentioned pulse amplitude may be influenced to a certain extent by an input amplification. The above-mentioned integration times also influence the measuring time and a sampling interval to a certain extent.

FIG. 2 shows a flow chart for further illustration of a classification method 800. Classification unit 180 executes a classification method according to illustrated classification system 850 for this purpose, with the aid of which classification is preferably performed on the basis of response signal 131, and detection device 100 is adapted to the instantaneous object and/or surroundings characteristic as a function of the classification result. A starting signal 810 is initially followed by a zero balance 820, during which detection device 100 calibrates itself. Detection device 100 subsequently passes into a pre-measurement operation 830, during which detection device 100 emits transmitting signal 120 into the surroundings with the aid of transmitter unit 110 and generates a response signal 131 (See FIG. 1) in the form of a pre-response signal 131.1 in the above-explained way. Classification unit 180 then performs a classification 840 of the object and/or surroundings characteristic on the basis of an analysis of pre-response signal 131.1 thus generated. For example, classification unit 180 determines from pre-response signal 131.1 a value of at least one classification parameter 1, 2, 3 . . . x, y (category) for each characteristic dimension A . . . E (dimension), e.g., for a geometric characteristic of an object, an electrical and/or magnetic conductivity of an object and/or the surroundings, a position of an object in the surroundings (cf. Table 1). An object and/or surroundings characteristic is thus classified on the basis of response signal 131 as a function of the value for above-mentioned dimension and category, e.g., as $A_1B_1C_1D_xE_x$, i.e., an object and/or surroundings characteristic is assigned to one of classes K1 . . . Kn. For example, a certain configuration and/or sequence S of coils is assigned to each class, which establishes which coils of transmitter unit 110 are to be used for the main measurement operation. For example, a coil configuration is assigned to second class K2, which is particularly well suited for the detection of objects and/or surroundings characteristics according to key $A_1B_1C_1D_xE_x$.

In addition, each class K1 . . . Kn contains a certain parameter set 850.1 . . . 850.n of above-explained parameters P1 . . . Pn for transmitter unit 110 and/or receiver unit 130, such as advantageously, e.g., pulse repetition frequency, energizing period, maximum current amplitude, sampling rate, amplification, or measuring time. The parameter thus set also includes a specification for a sequence and/or configuration of coils S1 . . . Sn in classes K1 . . . Kn. It may be established therein, for example, in which sequence the selected coils are to be energized to emit the further transmitting signal. Some of the above-mentioned variables may also be predefined by a user of detection device 100. The parameter thus set also includes parameters W1 . . . Wn for analysis characteristics for control and evaluation unit 160. After the classification, i.e., after the determination of the transmitting coils, the establishment of the parameter set and the coil sequence, the actual measurement is performed in the main measurement operation and therefore the detection of object 200 in surroundings 300. With the aid of control unit 170, parameters P1 . . . Pn, Si . . . Sn, W1 . . . Wn may additionally be changed for each i from 1 . . . n as the controlled variable, to optimize a response signal 131 as the controlled variable.

Figure 6:
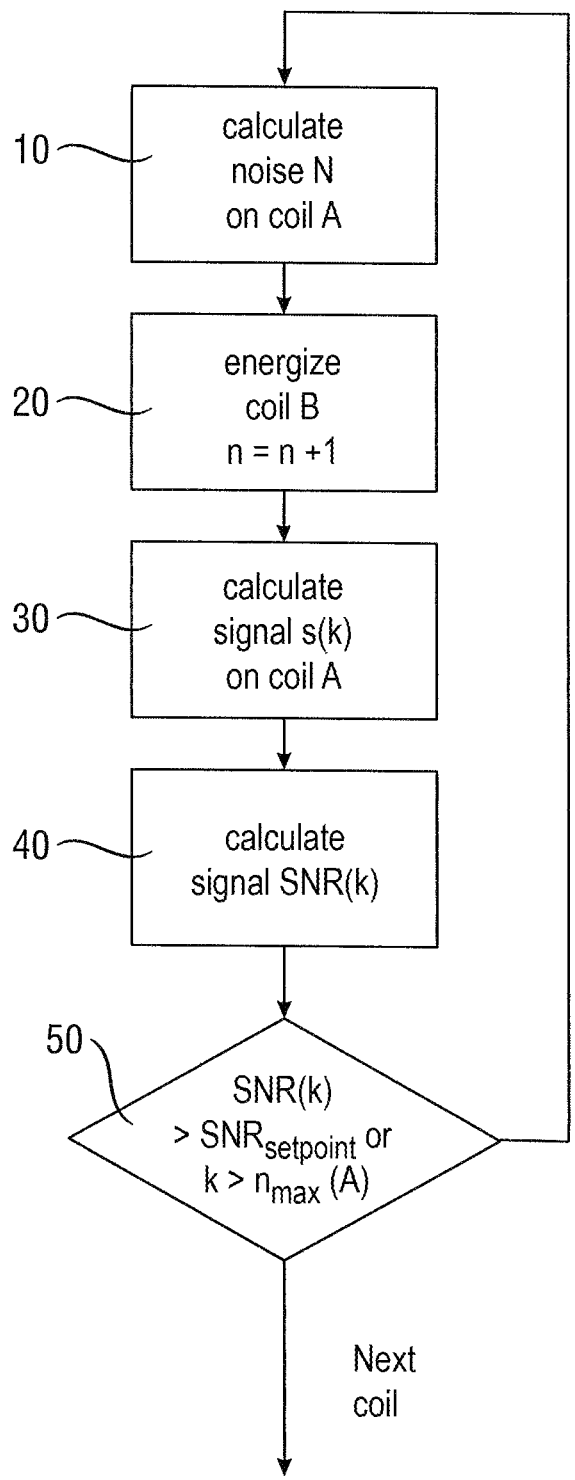
FIG. 6 shows a flow chart for the schematic illustration of a control loop for the purpose of setting an SNR value SNR(k) for a response signal above an SNR threshold $SNR_{setpoint}$ within the scope of a pre-measurement operation, e.g., with energizing of a transmitting coil.

It is understood that the actions in the pre-measurement operation may be repeated until main response signal 131.2 has an SNR value which exceeds a predefined threshold value; an example is explained on the basis of FIG. 6. The classification procedure may also be repeated until a classification of pre-response signal 131.1 may be performed with sufficient reliability. For example, detection device 100 displays the classification result to the user of detection device 100 via user interface 153 (MMI), and the user may then decide for himself whether he wishes to perform a main measurement Mi using parameters Si, Pi, Wi using a classification result, e.g., of class Ki, or whether he desires a renewed classification of a pre-response signal 131.1. If this is the case, the classification procedure begins again with pre-measurement operation 830.

Figure 3:
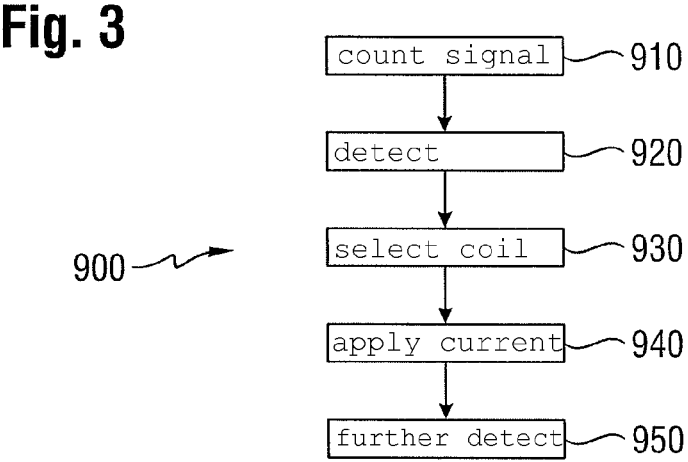
FIG. 3 shows a flow chart for the schematic illustration of one preferred specific embodiment of a detection method.

Finally, FIG. 3 shows a flow chart in summary to schematically illustrate a detection method 900 for detecting an electrically and/or magnetically conductive object in surroundings, in particular in a substrate. This method has the following steps according to the above explanations:

In a first step 910, an electromagnetic transmitting signal 120 is emitted into surroundings 300 with the aid of a transmitter unit 110. Transmitter unit 110 has a number of transmitters 112 in the form of transmitting coils. In the present case, transmitters 112 of transmitter unit 110 each differ from one another in their position within transmitter unit 110, in their size, in their diameter, and/or in their current carrying capacity.

In a second step 920, a detection of a response signal 131 as a function of emitted transmitting signal 120 and the condition of environment 300 follows. An electrical current may be applied to each of the number of transmitting coils 112 independently of particular remaining transmitting coils 112.

In detection method 900, in a third step 930, at least one of transmitting coils 112 is selected as a function of response signal 131, in particular pre-response signal 131.1.

In a fourth step 940, an electrical current is applied to the at least one selected transmitting coil 112, to thus emit a further transmitting signal 120, which is adapted with the aid of the at least one selected transmitting coil 112, into surroundings 300.

In a fifth step 950, a detection of an object 200 is performed as a function of a response signal 131 (main response signal 131.2) as a function of emitted further transmitting signal 120.

Figure 4A:
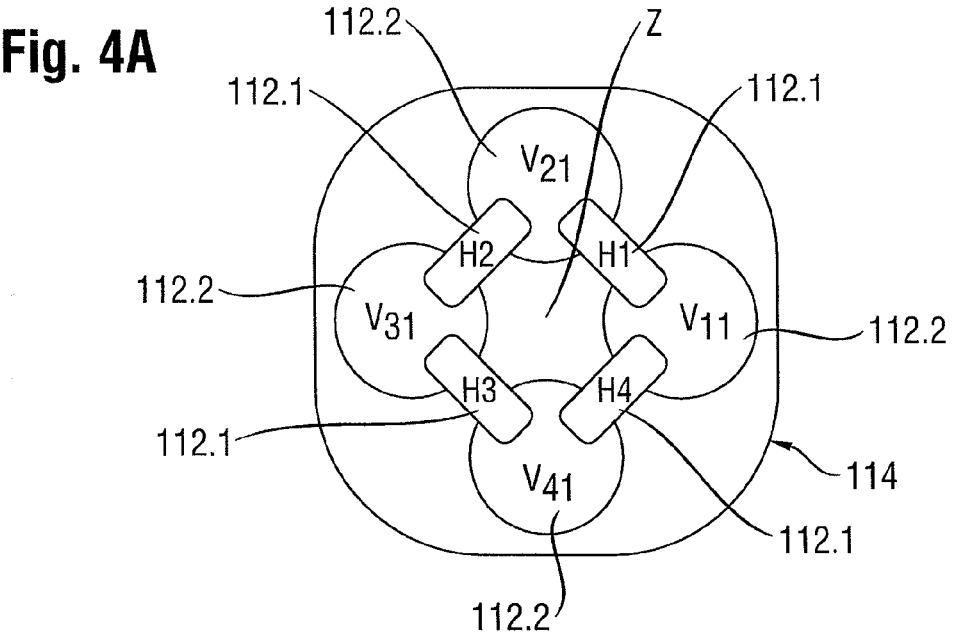
FIGS. 4a and 4b show a schematic top view and cross-sectional view respectively of one preferred combined transceiver unit in the form of a coil complex.
Figure 4B:
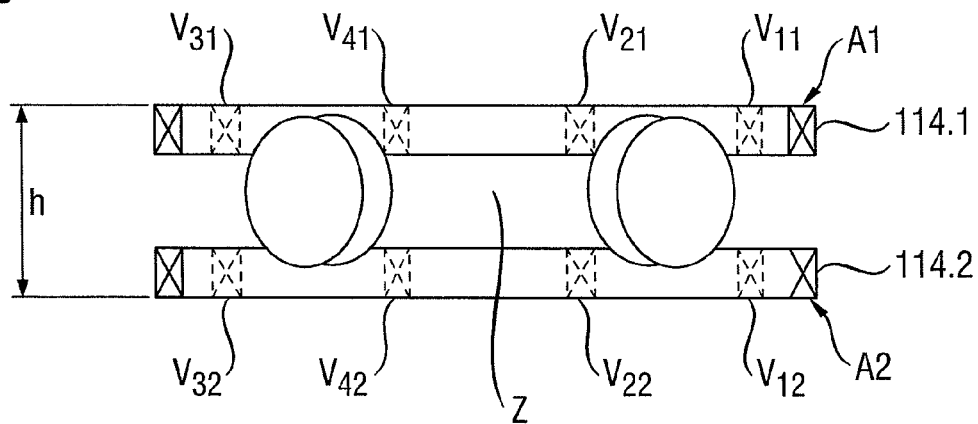

FIG. 4 shows a schematic view of a coil complex 114 of a combined transceiver unit 110, 130 for a sensor head 101. In each case one transmitter 112 and one receiver 132 are integrated as one or multiple of coils A1, A2, H1-H4, $V_{11}$, $V_{21}$, $V_{31}$, $V_{41}$, $V_{12}$, $V_{22}$, $V_{32}$, $V_{42}$ into coil complex 114. Coil complex 114 is switchable with the aid of control and evaluation unit 160 between a transmitting mode, in which at least one coil A1, A2, H1-H4, $V_{11}$, $V_{21}$, $V_{31}$, $V_{41}$, $V_{12}$, $V_{22}$, $V_{32}$, $V_{42}$ of coil complex 114 emits a transmitting signal 111, and a receiving mode, in which at least one coil A1, A2, H1-H4, $V_{11}$, $V_{21}$, $V_{31}$, $V_{41}$, $V_{12}$, $V_{22}$, $V_{32}$, $V_{42}$ of coil complex 114 receives a received signal 131.

Coil complex 114 has, for example, two coil heads 114.1 and 114.2—namely two transmitting and receiving coils situated ratiometrically at vertical distance h, coils A1, A2 here. Four ratiometrically situated vertical coils $V_{11}$, $V_{21}$, $V_{31}$, $V_{41}$ (assigned to coil A1) and another four ratiometrically situated vertical coils $V_{12}$, $V_{22}$, $V_{32}$, $V_{42}$ (assigned to coil A2) and four horizontally situated coils H1 through H4 are interleaved in these large coils A1, A2, the latter horizontal coils being situated at moderate height between large coils A1, A2 at a relatively small distance to center Z and being tilted by 45°. These coils, or at least a part thereof, typically function as transmitting coils for transmitter unit 110 and also as receiving coils for receiver unit 130. Each of these total of 14 coils may have an electrical current applied thereto independently of the remaining coils, i.e., in particular may also be activated as a transmitting and a receiving coil with the aid of control signals 140.1, 140.2. In addition, receiver unit 130 may detect currents, which have been induced in these coils by the secondary magnetic field generated by electrically conductive object 200, synchronously and in parallel. Receiver unit 130 preferably detects these currents with the aid of a rapid analog-digital converter, which has a clock rate of 1 MHz and a resolution of 12 bit, for example. Response signals 131 detected by receiver unit 130, i.e., in particular pre-response signal 131.1 and main response signal 131.2, are therefore accessible to digital processing. Control unit 170 preferably has digital processing means. For example, the signals detected by receiver unit 130 may be filtered and adapted using suitable filters. In addition, receiver unit 130 may simultaneously calculate summation and difference signals or ratios of the signals to one another. In addition, receiver unit 130 may digitally remove interfering direct components in the signal or other interferences.

In FIG. 5, two graphs schematically show a transmitted current curve (upper graph) and a voltage curve (lower graph) in a transmitting coil. To emit a transmitting signal, the controller formed from control and evaluation unit 160, control unit 170, and classification unit 180, in the present case specifically control unit 170, prompts an application of current (1(t)) to a transmitting coil during an established energizing period 113. If main response signal 131.2 is to be detected using the emitted transmitting signal, the energizing period is preferably, as already explained above in detail, adapted to the instantaneous measuring environment, i.e., determined by the controller, in particular classification unit 180, as a function of a previously detected pre-response signal 131.1.

The lower graph shows a voltage curve of a voltage which arises at a coil to which a current has been applied, which has approximately assumed the curve shown in the upper graph. The curve of voltage (U(t)) in the left part of the lower graph results essentially according to the system equation of a coil, specifically $$U = L * \frac{di(t)}{dt},$$

where L is the inductance of the transmitting coil. The voltage curve in the left part of the lower graph is thus approximately proportional to the slope of the current curve in the upper graph. A strong overvoltage arises through an abrupt shutoff of the current in the transmitting coil at the end of energizing period 113.

As explained above, applying a current pulse shown in FIG. 5 to a transmitting coil prompts an emission of an electromagnetic transmitting signal, which induces eddy currents in the object to be detected, which in turn generate a secondary magnetic field. This secondary magnetic field generates in the transmitting coil, which now acts as a receiving coil, an electrical current, which in turn induces a voltage in the receiving coil, which approximately assumes a curve shown in the right part of the lower graph. Reference numeral 135 identifies a measuring interval, within which receiver unit 130 may determine a noise component (cf. FIG. 6) and reference numeral 133 identifies a measuring time, within which the receiver unit detects main response signal 131.2. Both measuring time 133 and also measuring interval 135 are preferably established by control unit 170 as a function of pre-response signal 131.1.

FIG. 6 shows a possibility for a running calculation of an SNR value, which is preferably provided before the analysis of a response signal 131 by classification unit 180 and control and evaluation unit 160 of sensor head 101 has begun. The result of a control loop shown in FIG. 6 is that a response signal 131, if it is used as main response signal 131.2 for the detection of an object 200, is fundamentally above a signal-to-noise threshold established by a threshold value $SNR_{setpoint}$. False alarms may thus be reliably avoided and in addition the significance of response signal 131 is increased.

In detail, in a step 10, the calculation of noise N on an arbitrary coil A is initially performed, for example, on coil A1 of FIG. 4. Noise N may be estimated in the present case from the variance of a signal in the case of non-energizing of coil A.

For the determination of noise N described in step 10, it is advisable to use a point in time apparent in FIG. 5, shortly before energizing of coil A1 or A2. A few sampling points are sufficient to calculate the variance of the noise. Alternatively, the noise may also be determined during the energizing procedure, i.e., for an area of FIG. 5 identified by reference numeral 113.

In a further step 20, a further coil A2 of FIG. 4 is energized, and the signal strength may be determined, for example, from the integration of an eddy current response over a certain time interval $[t_1, t_2]$ or from a sum/difference of the eddy current response over multiple defined intervals. Signals of the signal strength may also be averaged up to a kth pulse. This means that such an averaged signal results after the kth pulse from the averaged signal of the preceding pulses.

In a fourth step 40, an SNR value SNR(k) may be calculated after the kth pulse, in that a quotient or another ratio is calculated from the signal strength calculated in step 30 and the variance calculated in step 10.

The SNR value ascertained in above-mentioned step 40 does not have to be calculated for all coils of coil complex 114. Rather, it is sufficient to determine the noise of one group of similar coils in each case for coil complex 114. For this purpose, it is sufficient if the noise of one of the coils of the group is determined in each case. For example, it is sufficient to determine a noise for coil A1, coil H1, and coil $V_{11}$.

In step 50, it is subsequently checked whether SNR value SNR(k) is above a noise threshold $SNR_{setpoint}$. If this is the case, an analysis of response signal 131 may be performed and, if needed, a further response signal 131 may be ascertained using a next coil. This is also true for the case in which the number of averaged pulse values k has reached a maximum number of pulses $n_{max}$. Analysis is also performed in the case which is practically equivalent to an abort condition.

If the query in step 50 is negative, however, the control loop is continued with step 10 and in step 20 the number of averaging cycles k, i.e., the number of pulses k averaged for response signal 131, is increased by 1—this is to achieve a sufficiently large SNR value SNR(k) if necessary in further testing in step 50 or to achieve the maximum number of pulses $n_{max}$.

The control loop described in FIG. 6 deviates from fixedly predefined pulse sequences having fixedly predefined energizing and measuring times, because a relatively large amount of measuring time is thus lost, which may be used better. With the preferred procedure described in FIG. 6, it is a function of the specific quality of response signal 131 whether it may be used. For example, if objects 200 are located with relatively little overlap, a few averaging cycles k are already sufficient to achieve a given $SNR_{setpoint}$, since the signal strength is comparatively great in such cases. A fixedly predefined number of averaging cycles for such cases would therefore be accompanied by wasted measuring time. On the other hand, the obtained measuring time may be used in such a case to utilize a long drop of the induced eddy currents, in that a relatively long measurement may be performed per current pulse, namely preferably up to 1 ms.

It is to be understood that the procedure described in FIG. 6 is only an example of making a measuring method variable as a function of the quality of a response signal 131. A corresponding parameter specification may be provided in a class K1 . . . Kn.

Figure 7:
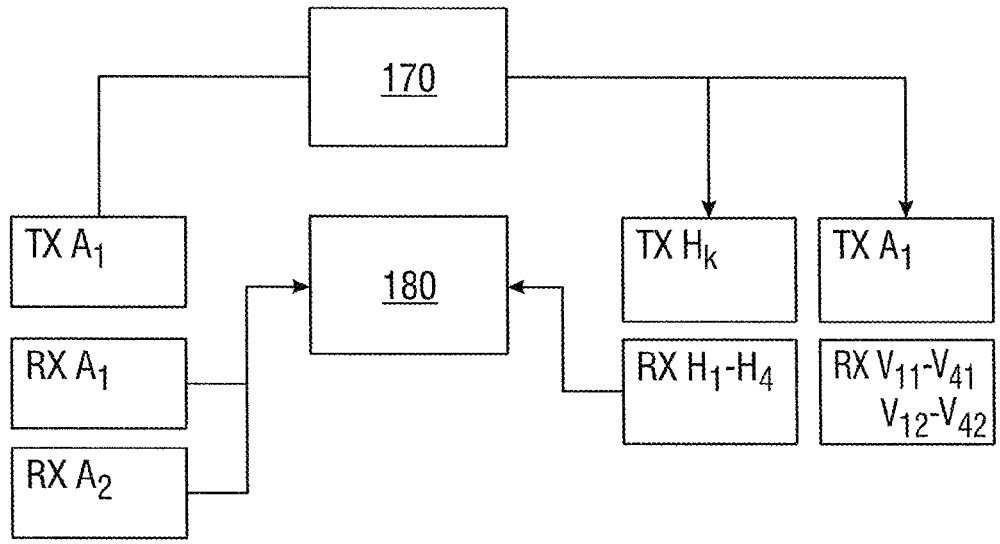
FIG. 7 shows a block diagram having a control and classification unit for a first preferred coil configuration in a coil complex of FIG. 4 for two exemplary selected classes of a class system of the classification unit to set a depth mode, on the one hand, and a high-resolution mode, on the other hand.
Figure 8:
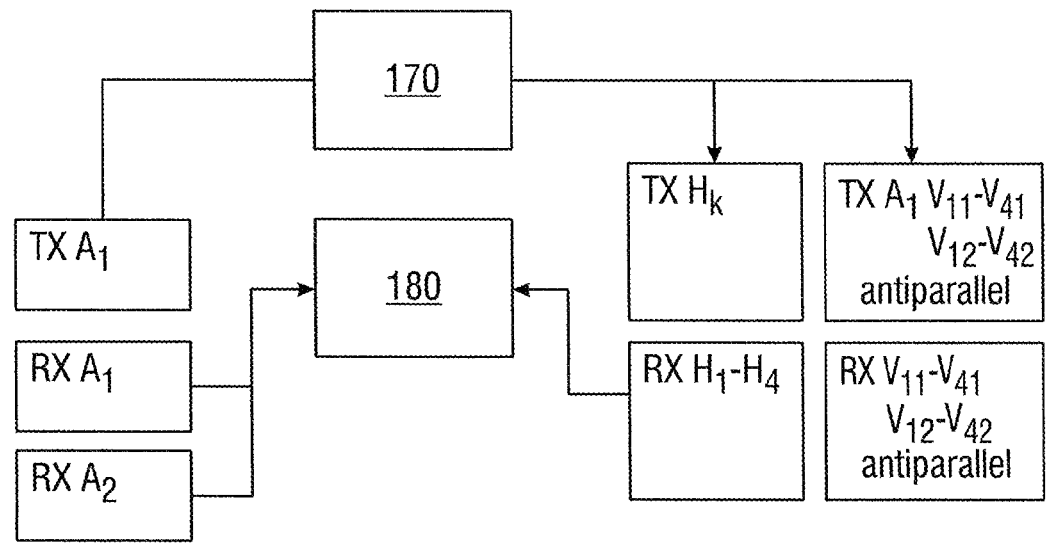
FIG. 8 shows a block diagram having a control and classification unit for a second preferred coil configuration in a coil complex of FIG. 4 for two exemplary selected classes of a class system of the classification unit to set a depth mode, on the one hand, and a grating-resolving mode, on the other hand.

FIG. 7 and FIG. 8 show various possibilities for interconnecting the coils of a coil complex 114 shown in FIG. 4. The interconnection may be performed according to an object and surroundings characteristic in various modes. In FIG. 7, for example, a first depth-resolving mode and a second high-resolution mode are shown. In FIG. 8, for example, the first depth-resolving mode and a second grating-resolving mode, which is suitable for welded gratings, are shown. The first depth-resolving mode is suitable in particular for a coil configuration for great depths but relatively low separation capability.

In the present case, in the first depth-resolving mode, which is shown on the left in FIG. 7 and FIG. 8, a comparatively large coil A1 is used as the transmitting coil TX and this same coil A1 may be used as receiving coil RX or further coil A2 may be used as receiving coil RX. If no object 200 is located in the vicinity of sensor head 101, pulsing is normally performed using a large coil A1 or A2, since it has the greatest range.

With reference to FIG. 7, the situation may arise in which a sensor head 101 approaches an object 200 up to a particularly small distance and therefore the signal strength of a response signal 131 exceeds a certain threshold. In this case, it is advisable for control unit 170, in combination with classification unit 180, to cause sensor head 101 to automatically change over to a higher resolution, i.e., in the present case to use higher-resolution coils of coil complex 114 having a shorter range.

Sensor head 101 is automatically switched over from the first, depth-resolving mode into the second, high-resolution mode with the aid of control unit 170 and classification unit 180. In the second, high-resolution mode, the coils of coil complex 114 may alternately be switched as transmitting coil (TX) or receiving coil (RX); e.g., with the aid of a selection of circuits which may be specified as follows:
(a) Vertical coils $V_{11}, V_{21}, V_{31}, V_{41}$ are energized (TX) and coils $V_{12}, V_{22}, V_{32}, V_{42}$ (RX) are measured or vice versa;
(b) Horizontal coils H1 through H4 are energized (TX) and measured (RX).
(c) Large coils A1 or A2 are energized (TX) and other coils $V_{11}, V_{21}, V_{31}, V_{41}, V_{12}, V_{22}, V_{32}, V_{42}$, H1 through H4 and A1, A2 are measured (RX).
(d) A combination of the sequences shown in (a) through (c).

Classification unit 180 may predefine in the present case, as a function of the depth or the diameter of object 200, either the first depth-resolving mode shown in the left part of FIG. 7 or the second high-resolution mode shown on the right side of FIG. 7 in suitable classes K1 . . . Kn.

With reference to FIG. 8, it may be advantageous with respect to welded gratings to switch over to a coil configuration which induces a vanishingly small flux in a substrate or in another surroundings 300. This prevents eddy currents from being induced in the meshes of the welded grating. As a result, welded gratings may be located correctly, i.e., sensor head 101 correctly indicates iron, for example, but not incorrectly in the middle of a mesh.

In this case, classification unit 180 in combination with control unit 170 may be switched over between the above-described depth-resolving mode (e.g., according to (b): horizontal coils H1 through H4 are energized (TX) and measured (RX)) and a grating-resolving mode for a coil configuration (e.g., according to (a): vertical coils $V_{11}, V_{21}, V_{31}, V_{41}$ are energized (TX) and vertical coils $V_{12}, V_{22}, V_{32}, V_{42}$ (RX) are measured or vice versa). In the grating-resolving mode, the vertical coils are switched to form magnetic poles aligned antiparallel—the latter is symbolically shown in the right part of FIG. 8. For the last-mentioned purpose, in the present case vertical coils $V_{11}, V_{21}, V_{31}, V_{41}, V_{12}, V_{22}, V_{32}, V_{42}$ are connected in series in such a way that the magnetic poles assigned thereto are antiparallel. If sensor head 101 is directly over a mesh of a welded grating, the total flux through the mesh is identical to 0, if the mesh width is greater than the dimension of sensor head 101. A mesh is very strongly coupled to an exciter coil (transmitting coil), since currents are induced in the mesh which counteract the exciter field. Through an antiparallel alignment of each two smaller coils, however, the flux through the mesh may be caused to vanish. No currents in the mesh are induced directly via the mesh, so that the mesh is invisible per se to the sensor head and is only detected as iron.

The recognition—e.g., here via a logic 181 having a support vector machine SVM—of whether it is a grating material, for example, a welded grating, is performed with the aid of classification unit 180, for example, via the analysis of response signal 131 in various coils. For example, it has been shown that by analyzing the signal strengths of the decay behavior and the curvature of a response signal 131, it may be determined with high reliability whether or not a welded grating is present.

What is claimed is:

1. A method for detecting an electrically and/or magnetically conductive object in surroundings of a sensor head of a device, the method comprising the following steps:
   emitting a transmitting signal into the surroundings;
   receiving a received signal as a function of the transmitting signal and characteristics of the object and the surroundings;
   analyzing a response signal formed from the received signal;
   the detection being controlled by:
   providing a class system having a plurality of classes differing from one another in at least one object and/or surroundings characteristic;
   classifying instantaneous object and/or surroundings characteristics as a function of the analyzed response signal into one of the classes of the class system, the one class defining a classified class; and
   detecting a further response signal using predefined detection characteristics preset in the classified class;
   wherein the classes have one or multiple of the classes from the group consisting of:
   a first class provided for gratings;
   a second class provided for dense objects, in particular with little overlap;
   a third class provided for deep objects;
   a fourth class provided for magnetic substrates;
   a fifth class provided for a certain movement direction; and
   a sixth class provided for nonmagnetic, conductive objects.

2. The method as recited in claim 1 wherein the instantaneous object and/or surroundings characteristics are adaptively classified as a function of the response signal with the aid of the class system.

3. The method as recited in claim 1 wherein at least one amplitude and/or one signal-to-noise ratio of the response signal is/are automatically controlled as a controlled variable.

4. The method as recited in claim 1 wherein the object and/or surroundings characteristics are reclassified multiple times and/or classified with averaging of the response signal.

5. The method as recited in claim 1 wherein the detection characteristics include: transmitting characteristics and/or receiving characteristics and/or analysis characteristics; and the detection is controlled in that:
a further transmitting signal is emitted using the set transmitting characteristics, and/or
a further received signal is received using the set receiving characteristics, and/or
the further received signal and/or the further response signal formed from the further received signal is analyzed using the set analysis characteristics.

6. The method as recited in claim 1 wherein the further response signal is automatically controlled in a control step, with the aid of the control characteristics assigned to the class, to a preset setpoint value of a reference variable.

7. The method as recited in claim 1 wherein, upon the presence of an abort condition, a control step is terminated and a starting group of detection characteristics is set.

8. A device for detecting an electrically and/or magnetically conductive object in surroundings of a sensor head of the device, comprising:
a transmitter unit having at least one transmitter and designed to emit a transmitting signal into the surroundings;
a receiver unit having at least one receiver and designed to receive a received signal as a function of the transmitting signal and characteristics of the object and the surroundings;
a control and evaluation unit designed to control the transmitting and receiver units and to analyze a response signal formed by the receiver unit from the received signal;
a classification unit using a class system, object and/or surroundings characteristics being classified in classes of the class system, the class system having a plurality of classes differing from one another in at least one object and/or surroundings characteristic, preset detection characteristics for the device being assigned to one class
wherein the classes have one or multiple of the classes from the group consisting of:
a first class provided for gratings;
a second class provided for dense objects, in particular with little overlap;
a third class provided for deep objects;
a fourth class provided for magnetic substrates;
a fifth class provided for a certain movement direction; and
a sixth class provided for nonmagnetic, conductive objects.

9. The device as recited in claim 8 wherein the surroundings characteristics include a condition of the surroundings of the object, and/or relative characteristics between the sensor head and the object.

10. The device as recited in claim 9 wherein the condition is a conductivity and/or permeability of the substrate, and the relative characteristics include a distance, relative position, and geometric configuration.

11. The device as recited in claim 8 wherein the object characteristics include material characteristics and or geometry characteristics of the object.

12. The device as recited in claim 11 wherein the material characteristics include conductivity or permeability, and the geometry characteristics include a diameter of the object.

13. The device as recited in claim 8 wherein the transmitting characteristics of the transmitter unit for each class and each transmitter include transmitter parameters, using with each of the transmitters is operable.

14. The device as recited in claim 13 wherein the transmitter parameters include one or multiple of the parameters selected from the group consisting of: pulse repetition frequency, pulse amplitude, pulse polarity, and energizing period.

15. The device as recited in claim 8 wherein the receiving characteristics of the receiver unit for each class and each receiver include receiver parameters, using with of the receivers is operable.

16. The device as recited in claim 15 wherein the receiver parameters include one or multiple of the parameters selected from the group consisting of: filter characteristics, amplifier characteristics, gate starting time and gate period, and averaging time or number of the averaging cycles.

17. The device as recited in claim 8 wherein the analysis characteristics for the control and evaluation unit for each class include one or multiple of the parameters selected from the group consisting of: averaging times, integration times, and filter coefficients.

18. The device as recited in claim 8 wherein a control unit is designed for the automatic control of at least the response signal as the controlled variable and is connected for control to the classification unit and the control and evaluation unit to form a control loop.

19. The device as recited in claim 18 wherein the automatic control is a non-manual control and the transmitter unit and/or receiver unit are also connected to the control unit to form the control loop.

20. The device as recited in claim 8 wherein preset control characteristics for a control unit are assigned to each class of the class system.

21. The device as recited in claim 20 wherein the control characteristics as the controlled variable include one or multiple control parameters from the group consisting of: pulse repetition frequency, pulse amplitude, pulse polarity, energizing period; averaging times, integration times, filter coefficients; filter characteristics, amplifier characteristics, gate starting time and gate period, and averaging time or number of averaging cycles.

22. The device as recited in claim 8 wherein in each case one transmitter and one receiver are integrated as one or multiple coils into a coil complex, the coil complex being switchable with the aid of the control and evaluation unit between a transmitting mode, in which a coil of the coil complex emits a transmitting signal, and a receiving mode, in which a coil of the coil complex receives a received signal.

* * * * *